United States Patent
Rauma et al.

(10) Patent No.: US 10,742,036 B2
(45) Date of Patent: Aug. 11, 2020

(54) POWER CONVERTER AND AN ELECTRIC POWER SYSTEM

(71) Applicant: DANFOSS EDITRON OY, Lappeenranta (FI)

(72) Inventors: Kimmo Tapio Rauma, Nordborg (DK); Tero Jarvelainen, Nordborg (DK)

(73) Assignee: DANFOSS EDITRON OY, Lappeenranta (FI)

( * ) Notice: Subject to any disclaimer, the term of this patent is extended or adjusted under 35 U.S.C. 154(b) by 128 days.

(21) Appl. No.: 15/953,727

(22) Filed: Apr. 16, 2018

(65) Prior Publication Data
US 2018/0309297 A1    Oct. 25, 2018

(30) Foreign Application Priority Data

Apr. 20, 2017   (EP) ..................................... 17167178

(51) Int. Cl.
*H02J 3/32*        (2006.01)
*H02M 3/158*    (2006.01)
*H02H 7/12*       (2006.01)
*H02M 3/155*    (2006.01)
*H02J 4/00*        (2006.01)
(Continued)

(52) U.S. Cl.
CPC ............. *H02J 3/32* (2013.01); *H02H 7/1213* (2013.01); *H02J 1/08* (2013.01); *H02J 1/102* (2013.01); *H02J 4/00* (2013.01); *H02M 3/155* (2013.01); *H02M 3/158* (2013.01); *B60L 2200/32* (2013.01); *B60L 2210/14* (2013.01); *B63H 21/17* (2013.01); *H02J 7/0013* (2013.01); *H02J 7/345* (2013.01); *H02J 2007/0067* (2013.01); *H02P 5/74* (2013.01); *Y02T 10/7225* (2013.01)

(58) Field of Classification Search
CPC ............. H02J 3/32; H02J 1/08; H02H 7/1213
USPC ......................................................... 307/9.1
See application file for complete search history.

(56) References Cited

U.S. PATENT DOCUMENTS

| 6,014,019 A | * | 1/2000 | Parker ..................... G05F 1/565 323/273 |
| 8,184,457 B2 | * | 5/2012 | Chen ....................... H02M 1/32 323/222 |
| 9,744,925 B2 | * | 8/2017 | Dong .................... B60R 16/023 |

FOREIGN PATENT DOCUMENTS

| CN | 102347698 A | 2/2012 |
| CN | 103532386 A | 1/2014 |

(Continued)

*Primary Examiner* — Michael R. Fin
(74) *Attorney, Agent, or Firm* — McCormick, Paulding & Huber PLLC

(57) ABSTRACT

A power converter comprises an inductor coil whose first pole is connected to an input terminal of the power converter, a controllable switch between the ground and a second pole of the inductor coil, a first unidirectionally conductive component providing a path for electric current from the inductor coil towards an output terminal of the power converter when the controllable switch is non-conductive, and an over-current protector at the output terminal. The power converter comprises a second unidirectionally conductive component for conducting electric current from the input terminal to the over-current protector in a fault situation where voltage at the output terminal is smaller than voltage at the input terminal. Thus, the second unidirectionally conductive component constitutes a low-inductance bypass route for fault current and enables the over-current protector to react fast to a fault situation.

13 Claims, 2 Drawing Sheets

(51) Int. Cl.
*H02J 1/08* (2006.01)
*H02J 1/10* (2006.01)
*H02J 7/00* (2006.01)
*B63H 21/17* (2006.01)
*H02P 5/74* (2006.01)
*H02J 7/34* (2006.01)

(56) References Cited

FOREIGN PATENT DOCUMENTS

| | | | |
|---|---|---|---|
| CN | 104137372 A | 11/2014 |
| DE | 102011088457 A1 | 6/2013 |
| DE | 102014109092 A1 | 12/2015 |
| EP | 2463995 A2 | 6/2012 |

\* cited by examiner

POWER CONVERTER AND AN ELECTRIC POWER SYSTEM

CROSS-REFERENCE TO RELATED APPLICATION

This application claims foreign priority benefits under U.S.C. § 119 to European Patent Application No. 17167178.7 filed on Apr. 20, 2017, the content of which is hereby incorporated by reference in its entirety.

TECHNICAL FIELD

The disclosure relates to a power converter for converting input direct voltage into output direct voltage. Furthermore, the disclosure relates to an electric power system that can be, for example but not necessarily, an electric power system of a ship or a direct current "DC" power distribution system.

BACKGROUND

In many cases, an electric power system comprises a direct voltage rail, one or more battery elements for supplying electric energy to the direct voltage rail, and one or more power converters for converting the direct voltage of the direct voltage rail into voltages suitable for one or more loads of the electric power system. The electric power system can be for example an electric power system of a ship in which case the loads of the electric power system may comprise one or more propulsion motors, an alternating voltage network of the ship, and other loads such as e.g. one or more bow thruster motors. The motors are advantageously alternating current "AC" motors and the corresponding power converters are inverters for converting the direct voltage of the direct voltage rail into alternating voltages suitable for the AC-motors.

In many cases it is advantageous that the direct voltage of the direct voltage rail is higher than the direct voltages of the battery elements. In these cases, each of the battery elements is typically connected with a voltage-increasing power converter, i.e. a boost converter, to the direct voltage rail. The power converter comprises typically an inductor coil whose first pole is connected to the respective battery element, a controllable switch between the ground and the second pole of the inductor coil, and an unidirectionally conductive component, e.g. a diode, for providing a path for electric current from the inductor coil towards the direct voltage rail in response to a situation in which the controllable switch is in a non-conductive state.

In an electric power system of the kind described above, there is typically a need to disconnect a voltage-increasing power converter from the direct voltage rail in fault situations where the direct voltage of the voltage rail drops below the battery voltage. A straightforward approach is to connect an over-current protector, e.g. a fuse, between the voltage-increasing power converter and the direct voltage rail. An inherent challenge related to this approach is that fault current which is needed for blowing the fuse, or for activating another over-current protector, flows through the inductor coil of the voltage-increasing power converter, and thus appropriate arrangements are needed for preventing and/or for protecting against harmful voltage peaks caused by abrupt changes in the above-mentioned fault current. Furthermore, there is a need to design the inductor coil and the unidirectionally conductive component, e.g. a diode, in accordance with the fault current that can be significantly higher than corresponding electric current in normal operation. Another approach is to provide the voltage-increasing power converter with circuitries arranged to ramp down the electric current of the inductor coil in response to a fault situation of the kind mentioned above. The above-mentioned circuitries, however, increase the complexity and the costs of the voltage-increasing power converter.

SUMMARY

The following presents a simplified summary in order to provide a basic understanding of some aspects of various embodiments. The summary is not an extensive overview of the invention. It is neither intended to identify key or critical elements of the invention nor to delineate the scope of the invention. The following summary merely presents some concepts in a simplified form as a prelude to a more detailed description of exemplifying embodiments.

In accordance with the invention, there is provided a new power converter for converting input direct voltage into output direct voltage. The power converter comprises:
  an input terminal for receiving the input direct voltage,
  an output terminal for supplying the output direct voltage to an external system,
  an inductor coil whose first pole is connected to a first pole of the input terminal,
  a controllable switch between a second pole of the input terminal and a second pole of the inductor coil, and
  a first unidirectionally conductive component, e.g. diode, for providing a path for electric current from the second pole of the inductor coil towards the output terminal in response to a situation in which the controllable switch is in a non-conductive state and electric current of the inductor coil flows towards the second pole of the inductor coil,
  an over-current protector, e.g. a fuse, at the output terminal, the over-current protector breaking electric current though the output terminal in response to a situation in which the electric current though the output terminal exceeds a pre-determined limit, and
  a second unidirectionally conductive component, e.g. a diode, for conducting electric current from the first pole of the inductor coil to the output terminal in response to a situation in which the output direct voltage is smaller than the input direct voltage.

The above-mentioned second unidirectionally conductive component constitutes a low-inductance bypass route for fault current. Therefore, sufficiently strong fault current can be directed to the over-current protector already at an early stage of a fault situation that drops the output direct voltage below the input direct voltage. Thus, the over-current protector is enabled to disconnect the power converter from the external system prior to the electric current of the inductor coil has had time to increase significantly. Furthermore, as the second unidirectionally conductive component constitutes the above-mentioned bypass route, the above-mentioned inductor coil and the first unidirectionally conductive component do not need to be dimensioned according to the fault current.

In accordance with the invention, there is provided also a new electric power system that can be, for example but not necessarily, an electric power system of a ship or a direct current "DC" power distribution system. An electric power system according to the invention comprises:
  one or more direct voltage rails,
  one or more battery elements,
  one or more first power converters of the kind described above for transferring electric energy from the one or more battery elements to the one or more direct voltage rails, each first power converter being connected to one of the one or more battery elements, and one or more second power converters, e.g. inverters, for converting one or more direct voltages of the one or more direct voltage rails into voltages suitable for one or more loads of the electric power system.

In accordance with the invention, there is provided also a new ship that comprises an electric power system of the kind described above. The loads of the electric power system of the ship may comprise for example one or more propulsion motors, an alternating voltage network of the ship, and/or other loads such as e.g. one or more bow thruster motors. The motors are advantageously alternating current "AC" motors and the corresponding power converters are inverters for converting the one or more direct voltages of the one or more direct voltage rails into alternating voltages suitable for the AC-motors.

A number of exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DETAILED DESCRIPTION

The specific examples provided in the description given below should not be construed as limiting the scope and/or the applicability of the appended claims. Lists and groups of examples provided in the description given below are not exhaustive unless otherwise explicitly stated.

Figure 1A:
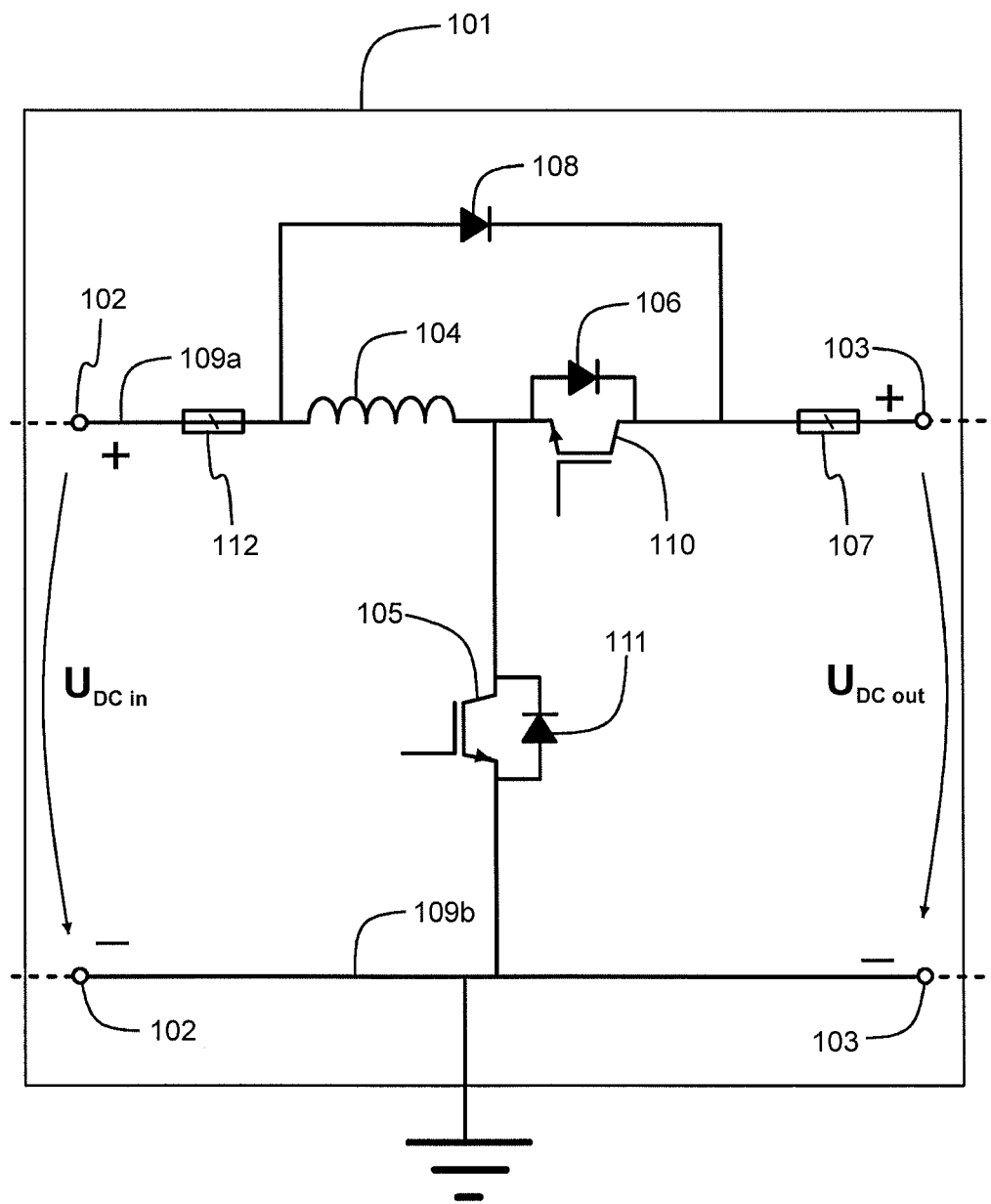
FIG. 1a shows a schematic illustration of a main circuit of a power converter according to an exemplifying and non-limiting embodiment.

FIG. 1a shows a schematic illustration of a main circuit of a power converter 101 according to an exemplifying and non-limiting embodiment. The power converter comprises an input terminal 102 for receiving input direct voltage $U_{DC\ in}$ and an output terminal 103 for supplying output direct voltage $U_{DC\ out}$ to an external system. The power converter 101 is a voltage-increasing converter, i.e. a boost-converter, capable of transferring electric energy from the input terminal 102 to the output terminal 103 in a controlled way when the input direct voltage $U_{DC\ in}$ is smaller than the output direct voltage $U_{DC\ out}$. The power converter comprises an inductor coil 104 whose first pole is connected to a first pole 109a of the input terminal 102. The power converter comprises a first controllable switch 105 between a negative pole 109a of the input terminal and a second pole of the inductor coil 104. The controllable switch 105 can be for example an insulated gate bipolar transistor "IGBT", a gate turn-off thyristor "GTO", a bipolar transistor, or a field-effect transistor "FET". The power converter comprises a first unidirectionally conductive component 106 for providing a path for electric current from the second pole of the inductor coil 104 towards the output terminal 103 in response to a situation in which the controllable switch 105 is in a non-conductive state and electric current of the inductor coil 104 flows towards the second pole of the inductor coil, i.e. towards the output terminal 103. The unidirectionally conductive component 106 can be for example a diode. It is, however, also possible that the unidirectionally conductive component 106 is or comprises a controllable switch which is controlled in an opposite phase with respect to the controllable switch 105. The power converter comprises a first over-current protector 107 at the output terminal 103. In this exemplifying case, the over-current protector 107 is between the unidirectionally conductive component 106 and the positive pole of the output terminal 103. The over-current protector 107 is configured to break electric current though the output terminal 103 in response to a situation in which the electric current though the output terminal 103 exceeds a pre-determined limit. The over-current protector 107 can be for example a fuse. The power converter further comprises a second unidirectionally conductive component 108 for conducting electric current from the first pole of the inductor coil 104 to the output terminal 103 in response to a fault situation in which the output direct voltage $U_{DC\ out}$ is smaller than the input direct voltage $U_{DC\ in}$, i.e. $U_{DC\ out} < U_{DC\ in}$.

The unidirectionally conductive component 108 constitutes a low-inductance bypass route from the input terminal 102 to the over-current protector 107. Therefore, sufficiently strong fault current can be directed to the over-current protector 107 already at an early stage of a fault situation that drops the output direct voltage $U_{DC\ out}$ below the input direct voltage $U_{DC\ in}$. Thus, the over-current protector 107 is enabled to disconnect the power converter from the external system prior to the electric current of the inductor coil 104 has had time to increase significantly. Furthermore, as the unidirectionally conductive component 108 constitutes the above-mentioned bypass route, the inductor coil 104 and the unidirectionally conductive component 106 do not need to be dimensioned according to the fault current which can be significantly higher than electric current during normal operation.

In the exemplifying case illustrated in FIG. 1a, the power converter 101 further comprises components for enabling the power converter to transfer electric energy from the output terminal 103 to the input terminal 102 so as to for example charge a battery element in cases where the battery element is connected to the input terminal 102. The battery element is not shown in FIG. 1a. The power converter 101 comprises a second controllable switch 110 for conducting electric current from the output terminal 103 to the second pole of the inductor coil 114. The controllable switch 110 can be for example an insulated gate bipolar transistor "IGBT", a gate turn-off thyristor "GTO", a bipolar transistor, or a field-effect transistor "FET". The power converter 101 comprises a third unidirectionally conductive component 111 for providing a path for electric current from the second pole 109b of the input terminal 102 to the second pole of the inductor coil 104 in response to a situation in which the controllable switch 110 is in a non-conductive state and the electric current of the inductor coil 104 flows towards the first pole of the inductor coil, i.e. towards the input terminal 102. The unidirectionally conductive component 111 can be for example a diode. It is however also possible that the unidirectionally conductive component 111 is or comprises a controllable switch which is controlled in an opposite phase with respect to the controllable switch 110. With the aid of the inductor coil 104, the controllable switch 110, and the unidirectionally conductive component 111, the power converter 101 is capable of transferring electric energy from the output terminal 103 to the input terminal 102 in a controlled way when the input direct voltage $U_{DC\ in}$ is smaller than the output direct voltage $U_{DC\ out}$. In an exemplifying case where the controllable switches 105 and 110 are IGBTs or metal oxide semiconductor field effect transistors "MOSFET", the unidirectionally conductive components 106 and 111 can be body diodes of the IGBTs or the MOSFETs.

A power converter according to an exemplifying and non-limiting embodiment further comprises a second over-current protector 112 so that the first pole of the inductor coil 104 is connected to the first pole 109a of the input terminal 102 via the second over-current protector 112. The over-current protector 112 is configured to break electric current though the over-current protector 112 in response to a situation in which the electric current though the over-current protector 112 exceeds a pre-determined limit. The over-current protector 112 can be for example a fuse.

In addition to the electrical components shown in FIG. 1a, the power converter 101 may further comprise capacitors and/or other elements which are arranged to absorb energy stored by the inductor coil 104 at a moment when one or both of the over-current protectors 107 and 112 break electric current. Furthermore, the power converter 101 may further comprise e.g. one or more diodes or other elements for providing alternative paths for inductive current when one or both of the over-current protectors 107 and 112 break electric current.

Figure 1B:
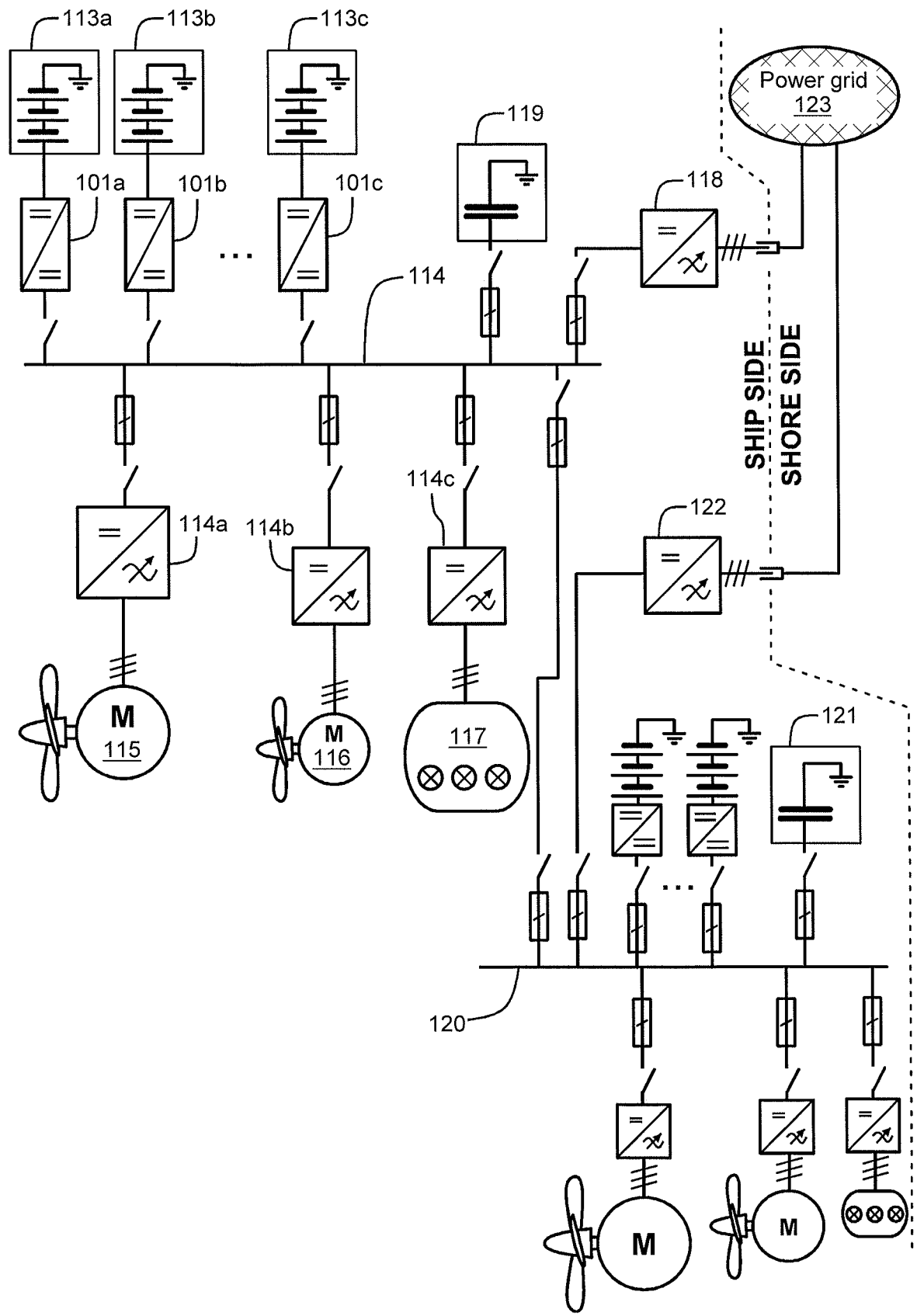
FIG. 1b shows a schematic illustration of an electric power system according to an exemplifying and non-limiting embodiment.

FIG. 1b shows a schematic illustration of an electric power system according to an exemplifying and non-limiting embodiment. In this exemplifying case, the electric power system is an electric power system of a ship. The electric power system comprises a direct voltage rail 114, battery elements, and first power converters for transferring electric energy from the battery elements to the direct voltage rail. In FIG. 1b, three of the battery elements are denoted with figure references 113a, 113b, and 113c, and three of the first power converters are denoted with figure references 101a, 101b, and 101c. Each of the first power converters 101a-101c can be similar to the power converter 101 illustrated in FIG. 1a. The electric power system comprises second power converters for converting the direct voltage of the direct voltage rail 114 into voltages suitable for loads of the electric power system. In FIG. 1b, three of the second power converters are denoted with figure references 114a, 114b, and 114c. In the exemplifying case illustrated in FIG. 1b, the loads of the electric power system comprise a propulsion system, bow thruster motors, and an alternating voltage network. In FIG. 1b, one of the electric motors of the propulsion system is denoted with a figure reference 115, one of the bow thruster motors is denoted with a figure reference 116, and a part of the alternating voltage network is denoted with a figure reference 117. In the exemplifying case illustrated in FIG. 1b, the second converters comprise inverters for converting the direct voltage of the direct voltage rail into alternating voltages suitable for the loads of the electric power system.

The exemplifying electric power system illustrated in FIG. 1b further comprises a capacitor system 119 connected to the direct voltage rail 114. The capacitor system 119 may comprise for example one or more high-capacitance electric double layer capacitors "EDLC" which are also called "super capacitors". The capacitance of the capacitor system 119 is advantageously at least 0.1 F, more advantageously at least 1 F, and yet more advantageously at least 10 F.

The exemplifying electric power system illustrated in FIG. 1b comprises another direct voltage rail 120 so that the direct voltage rails 114 and 120 of the electric power system are connected to each other via over-current protectors. The portions of the electric power system connected to different ones of the direct voltage rails are advantageously operable independently of each other in order to improve the operational reliability of the electric power system. The electric power system comprises another capacitor system 121 connected to the direct voltage rail 120.

The exemplifying electric power system illustrated in FIG. 1b comprises charging converters 118 and 122 for receiving electric energy from an external power network 123 and for supplying the electric energy to the direct voltage rails 114 and 120 via over-current protectors. The electric power system comprises means for charging the battery elements with the electric energy received from the power network 123. The power converters between the battery elements and the direct voltage rails can be provided with components and control systems for enabling the power converters to transfer electric energy from the direct voltage rails to the battery elements. The components for enabling the charging operation can be for example such as the controllable switch 110 and the unidirectionally conductive component 111 illustrated in FIG. 1a. It is, however, also possible that the electric power system comprises separate power converters for charging the battery elements.

Each of the power converters of the above-described electric power system may comprise a controller for controlling the operation of the power converter under consideration. It is also possible that a single controller is configured to control many power converters. A controller can be implemented with one or more processor circuits each of which can be a programmable processor circuit provided with appropriate software, a dedicated hardware processor such as for example an application specific integrated circuit "ASIC", or a configurable hardware processor such as for example a field programmable gate array "FPGA". Furthermore, each controller may comprise one or more memory circuits. The controllers are not shown in FIGS. 1a and 1b.

The electric power system illustrated in FIG. 1b may further comprise one or more combustion engine driven generators which are connected to one or both of the direct voltage rails 114 and 120 with suitable power converters. The combustion engine driven generators are not shown in FIG. 1b. Furthermore, the electric power system may comprise one or more solar cells and/or fuel cells and/or other electric power sources connected to one or both of the direct voltage rails 114 and 120 with suitable power converters. In a case where an electric power system according to an exemplifying embodiment is a direct current "DC" power distribution system, the electric power system may comprise one or more wind turbine driven generators which are connected to one or more direct voltage rails with suitable power converters.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A power converter comprising:
an input terminal for receiving input direct voltage,
an output terminal for supplying output direct voltage to an external system,
an inductor coil whose first pole is connected to a first pole the input terminal,
a first controllable switch between a second pole of the input terminal and a second pole of the inductor coil,
a first unidirectionally conductive component for providing a path for electric current from the second pole of the inductor coil towards the output terminal in response to a situation in which the first controllable switch is in a non-conductive state and electric current of the inductor coil flows towards the second pole of the inductor coil,
a first over-current protector at the output terminal, the first over-current protector breaking electric current though the output terminal in response to a situation in which the electric current though the output terminal exceeds a first pre-determined limit,
a second unidirectionally conductive component for conducting electric current from the first pole of the inductor coil to the output terminal in response to a situation in which the output direct voltage is smaller than the input direct voltage,
wherein the power converter further comprises the following components for enabling the power converter to transfer electric energy from the output terminal to the input terminal:
a second controllable switch for conducting electric current from a first pole of the output terminal to the second pole of the inductor coil, and
a third unidirectionally conductive component for providing a path for electric current from the second pole of the input terminal to the second pole of the inductor coil in response to a situation in which the second controllable switch is in a non-conductive state and the electric current of the inductor coil flows towards the first pole of the inductor coil.

2. The power converter according to claim 1, wherein the power converter further comprises a second over-current protector so that the first pole of the inductor coil is connected to the first pole of the input terminal via the second over-current protector, the second over-current protector breaking electric current though the second over-current protector in response to a situation in which the electric current though the second over-current protector exceeds a second pre-determined limit.

3. The power converter according to claim 1, wherein the power converter further comprises a second over-current protector so that the first pole of the inductor coil is connected to the first pole of the input terminal via the second over-current protector, the second over-current protector breaking electric current though the second over-current protector in response to a situation in which the electric current though the second over-current protector exceeds a second pre-determined limit.

4. The power converter according to claim 1, wherein the first unidirectionally conductive component is a diode.

5. The power converter according to claim 1, wherein the second unidirectionally conductive component is a diode.

6. An electric power system according to claim 1, wherein the first over-current protector is a fuse.

7. An electric power system comprising:
one or more direct voltage rails,
one or more battery elements,
one or more first power converters for transferring electric energy from the one or more battery elements to the one or more direct voltage rails, each first power converter being connected to one of the one or more battery elements, and
one or more second power converters for converting one or more direct voltages of the direct voltage rail into voltages suitable for one or more loads of the electric power system,
wherein each of the one or more first power converters comprises:
an input terminal for receiving input direct voltage from the respective battery element,
an output terminal for supplying output direct voltage to the respective direct voltage rail,
an inductor coil whose first pole is connected to a first pole the input terminal,
a first controllable switch between a second pole of the input terminal and a second pole of the inductor coil,
a first unidirectionally conductive component for providing a path for electric current from the second pole of the inductor coil towards the output terminal in response to a situation in which the first controllable switch is in a non-conductive state and electric current of the inductor coil flows towards the second pole of the inductor coil,
a first over-current protector at the output terminal, the first over-current protector breaking electric current though the output terminal in response to a situation in which the electric current though the output terminal exceeds a first pre-determined limit, and
a second unidirectionally conductive component for conducting electric current from the first pole of the inductor coil to the output terminal in response to a situation in which the output direct voltage is smaller than the input direct voltage,
wherein the power converter further comprises the following components for enabling the power converter to transfer electric energy from the output terminal to the input terminal:
a second controllable switch for conducting electric current from a first pole of the output terminal to the second pole of the inductor coil, and
a third unidirectionally conductive component for providing a path for electric current from the second pole of the input terminal to the second pole of the inductor coil in response to a situation in which the second controllable switch is in a non-conductive state and the electric current of the inductor coil flows towards the first pole of the inductor coil.

8. The electric power system according to claim 7, wherein the one or more second power converters comprise one or more inverters for converting the one or more direct voltages of the one or more direct voltage rails into alternating voltages suitable for one or more of the loads of the electric power system.

9. The electric power system according to claim 7, wherein the electric power system comprises one or more charging converters for receiving electric energy from an external power network and for supplying the electric energy to the one or more direct voltage rails.

10. The electric power system according to claim 8, wherein the electric power system comprises one or more charging converters for receiving electric energy from an external power network and for supplying the electric energy to the one or more direct voltage rails.

11. The electric power system according to claim 7, wherein the electric power system comprises one or more capacitor systems connected to the one or more direct voltage rails.

12. The electric power system according to claim 11, wherein the one or more capacitor systems comprise one or more electric double layer capacitors.

13. A ship comprising an electric power system comprising:
   one or more direct voltage rails,
   one or more battery elements,
   one or more first power converters for transferring electric energy from the one or more battery elements to the one or more direct voltage rails, each first power converter being connected to one of the one or more battery elements, and
   one or more second power converters for converting one or more direct voltages of the direct voltage rail into voltages suitable for one or more loads of the electric power system,
wherein each of the one or more first power converters comprises:
   an input terminal for receiving input direct voltage from the respective battery element,
   an output terminal for supplying output direct voltage to the respective direct voltage rail,
   an inductor coil whose first pole is connected to a first pole the input terminal,
   a first controllable switch between a second pole of the input terminal and a second pole of the inductor coil,
   a first unidirectionally conductive component for providing a path for electric current from the second pole of the inductor coil towards the output terminal in response to a situation in which the first controllable switch is in a non-conductive state and electric current of the inductor coil flows towards the second pole of the inductor coil,
   a first over-current protector at the output terminal, the first over-current protector breaking electric current though the output terminal in response to a situation in which the electric current though the output terminal exceeds a first pre-determined limit, and
   a second unidirectionally conductive component for conducting electric current from the first pole of the inductor coil to the output terminal in response to a situation in which the output direct voltage is smaller than the input direct voltage,
wherein the power converter further comprises the following components for enabling the power converter to transfer electric energy from the output terminal to the input terminal:
   a second controllable switch for conducting electric current from a first pole of the output terminal to the second pole of the inductor coil, and
   a third unidirectionally conductive component for providing a path for electric current from the second pole of the input terminal to the second pole of the inductor coil in response to a situation in which the second controllable switch is in a non-conductive state and the electric current of the inductor coil flows towards the first pole of the inductor coil.

* * * * *